(12) United States Patent
Shaw et al.

(10) Patent No.: US 11,991,081 B1
(45) Date of Patent: *May 21, 2024

(54) MICRO SID PACKET PROCESSING

(71) Applicant: Juniper Networks, Inc., Sunnyvale, CA (US)

(72) Inventors: Nancy Y. Shaw, Cupertino, CA (US); Sharada Yeluri, Cupertino, CA (US); Venkatraman Chandrasekaran, Cupertino, CA (US); Sri Karthik Goud Gadela, Cupertino, CA (US); Swamy Sadashivaiah Renu Kananda, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/934,431

(22) Filed: Sep. 22, 2022

Related U.S. Application Data

(63) Continuation of application No. 17/247,955, filed on Dec. 31, 2020, now Pat. No. 11,477,119.

(51) Int. Cl.
*H04L 45/745* (2022.01)
*H04L 45/02* (2022.01)
*H04L 45/12* (2022.01)
*H04L 69/22* (2022.01)

(52) U.S. Cl.
CPC ............ *H04L 45/745* (2013.01); *H04L 45/02* (2013.01); *H04L 45/12* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 10,841,220 B1 | 11/2020 | Filsfils et al. | |
| 11,323,371 B1 | 5/2022 | Goud Gadela et al. | |
| 11,477,119 B1* | 10/2022 | Shaw | H04L 45/02 |
| 11,582,140 B2* | 2/2023 | Nainar | H04L 45/20 |
| 2012/0226700 A1* | 9/2012 | Chang | G06Q 30/0204 |
| | | | 707/E17.084 |

(Continued)

OTHER PUBLICATIONS

Filsfils et al., "Network Programming extension: SRv6 uSID instruction," draft-filsfils-spring-net-pgm-extension-srv6-usid-08, Internet-Draft, Network Working Group, Nov. 2, 2020, 22 pp.

(Continued)

*Primary Examiner* — Xavier S Wong
(74) *Attorney, Agent, or Firm* — Shumaker & Sieffert, P.A.

(57) ABSTRACT

An example first network device includes a control unit configured to execute at least one application and a forwarding unit. The forwarding unit includes an interface configured to receive packets, at least one packet processor operably coupled to a memory, and a forwarding path, wherein at least a portion of the forwarding path is stored in the memory and is executable by the at least one packet processor. The forwarding unit is configured to receive an advertisement originated by a second network device in a network, wherein the advertisement specifies a second micro segment identifier (SID), and store, in a destination lookup table, a route entry comprising a first micro SID associated with the first network device and the second micro SID.

20 Claims, 6 Drawing Sheets

(56) References Cited

U.S. PATENT DOCUMENTS

2021/0092053 A1 3/2021 Filsfils et al.
2021/0320884 A1 10/2021 Filsfils et al.
2021/0352009 A1 11/2021 Van de Velde et al.

OTHER PUBLICATIONS

Filsfils et al., "Segment Routing Architecture draft-filsfils-rtgwg-segment-routing-00," Internet-Draft, Network Working Group, Jun. 28, 2013, 28 pp.
Filsfils et al., "Segment Routing Architecture," draft-filsfils-spring-segment-routing-04, Internet-Draft, Network Working Group, Jul. 3, 2014, 18 pp.
Filsfils et al., "Segment Routing Use Cases," Network Working Group, draft-filsfils-rtgwg-segment-routing-use-cases-01, Internet-Draft, Jul. 14, 2013, 46 pp.
Filsfils et al., "Segment Routing with MPLS data plane," draft-filsfils-spring-segment-routing-mpls-03, Internet-Draft, Network Working Group, Jul. 31, 2014, 14 pp.
Previdi et al., "Source Packet Routing in Networking (SPRING) Problem Statement and Requirements," RFC 7855, Internet Engineering Task Force (IETF), May 2016, 19 pp.
Prosecution History from U.S. Appl. No. 17/247,955, dated Mar. 24, 2022 through Jun. 24, 2022, 30 pp.
Tulumello et al., Micro SIDs: a solution for Efficient Representation of Segment IDs in SRv6 ,arXiv:2007.12286, Jul. 23, 2020 (v1), last revised Oct. 16, 2020 (this version, v3), 12 pp.

* cited by examiner

MICRO SID PACKET PROCESSING

This application is a continuation of U.S. patent application Ser. No. 17/247,955, filed 31 Dec. 2020, the entire contents of which is incorporated herein by reference.

TECHNICAL FIELD

The disclosure relates to computer networks and, more particularly, to engineering traffic flows within computer networks.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form.

Certain devices (e.g., nodes) within the network, referred to as routers, use routing protocols to exchange and accumulate topology information that describes the network. This allows a router to construct its own routing topology map of the network. Upon receiving an incoming data packet, the router examines keying information within the packet and forwards the packet in accordance with the accumulated topology information.

Many routing protocols fall within a protocol class referred to as Interior Gateway Protocol (IGP) in which flooding-based distribution mechanisms are used to announce topology information to routers within the network. These routing protocols typically rely on routing algorithms that require each of the routers to have synchronized routing topology information for a given domain, referred to as the IGP area or domain. The contents of a Link State Database (LSDB) or a Traffic Engineering Database (TED) maintained in accordance with a link state routing protocol have the scope of an IGP domain. IGP routing protocols typically require that all routers in the IGP routing domain store within an internal LSDB or TED all of the routing information that has been distributed according to the IGP protocol. In operation, each router typically maintains an internal link state database and scans the entire database at a defined interval to generate and output link state messages to synchronize the database to neighboring routers within the routing domain. In this way, link state is propagated across the entire routing domain and stored in full at each router within the domain.

Packet-based networks increasingly utilize label switching protocols for traffic engineering and other purposes. Multi-Protocol Label Switching (MPLS) is a mechanism used to engineer traffic patterns within Internet Protocol (IP) networks according to the routing information maintained by the routers in the networks. By utilizing MPLS protocols, such as the Label Distribution protocol (LDP), the Resource Reservation Protocol (RSVP) with Traffic Engineering extensions (RSVP-TE), or the Segment Routing (SR) extension, label switching routers can forward traffic along a particular path through a network to a destination device, i.e., a Label Switched Path (LSP), using labels prepended to the traffic. An LSP defines a distinct path through the network to carry MPLS packets from the source device to a destination device. Using a MPLS protocol, each router along an LSP allocates a label in association with the destination and propagates the label to the closest upstream router along the path. Routers along the path add (push), remove (pop) or swap the labels and perform other MPLS operations to forward the MPLS packets along the established path.

Routers may employ segment routing techniques, such as by using a Source Packet Routing in Networking (SPRING) protocol, that provides segment routing within an IGP domain to advertise single or multi-hop LSPs. SPRING includes multiple different label types including "adjacency" labels and "node" labels. To forward a packet through the network, the routers may push (and pop) one or more labels in a label stack, e.g., a segment list, that is applied to the packet as it is forwarded through the network.

Routers may also employ segment routing techniques over IPv6 (IP version 6). With segment routing over IPv6 (SRv6), routers may utilize segment routing without MPLS. SRv6 may be utilized in networks even if all transit network nodes are not SRv6 capable. This eliminates the need to deploy segment routing on all nodes in a network. In an SRv6 capable network, routers may not only employ segment identifiers (SIDs) which may be used to identify segments, but also employ micro segment identifiers (SIDs) which may occupy less space in a packet header than traditional SIDs.

SUMMARY

In general, this disclosure describes techniques for routing packets using micro SIDs in segment routing. According to the techniques of this disclosure, a network device, such as a router, may store a plurality of micro SIDs as a single route entry in a destination address table and, when receiving a packet, perform a single lookup for a plurality of micro SIDs that are in a header of the packet in the destination address table.

As described herein, a router may receive advertisements originated by other routers in a network. Each respective advertisement may specify a respective prefix and a respective SID and/or micro SID. The respective prefix may be an address or block of addresses. For instance, the respective prefix may specify an Internet Protocol (IP) address or block of IP addresses. Typically, in response to receiving an advertisement, the router determines a route through the network to the prefix specified by the advertisement. Additionally, the router associates the SID or the micro SID with the route. Subsequently, when the router receives a packet with the SID or micro SID attached, the router typically forwards the packet to a next hop along the determined route associated with the SID or micro SID.

However, when a router receives a packet with a micro SID in the header, the ingress forwarding unit may have to process the packet twice before forwarding the packet on to the next hop. The techniques of this disclosure include techniques designed to reduce the number of passes through an ingress packet processor to a single pass, thereby potentially saving processing time and power, and improving scalability.

In one example, this disclosure describes a method including receiving, by a first network device in a network, an advertisement originated by a second network device in a network, wherein the advertisement specifies a second micro segment identifier (SID); and storing, by the first network device, in a destination lookup table of a forwarding unit of the first network device, a route entry comprising a first micro SID associated with the first network device and the second micro SID.

In another example, this disclosure describes a network device including a control unit configured to execute at least one application and a forwarding unit comprising: an interface configured to receive packets; at least one packet processor operably coupled to a memory; and a forwarding path, wherein at least a portion of the forwarding path is stored in the memory and is executable by the at least one packet processor; wherein the forwarding unit is configured to: receive an advertisement originated by a second network device in a network, wherein the advertisement specifies a second micro segment identifier (SID); and store, in a destination lookup table of the forwarding unit, a route entry comprising a first micro SID associated with the first network device and the second micro SID.

In yet another example, this disclosure describes a non-transitory computer-readable medium storing instructions, which when executed, cause processing circuitry of a first network device to receive an advertisement originated by a second network device in a network, wherein the advertisement specifies a second micro segment identifier (SID), and store, in a destination lookup table of a forwarding unit of the first network device, a route entry comprising a first micro SID associated with the first network device and the second micro SID.

The details of one or more examples are set forth in the accompanying drawings and the description below. Other features, objects, and advantages will be apparent from the description, drawings, and from the claims.

DETAILED DESCRIPTION

Figure 1A:
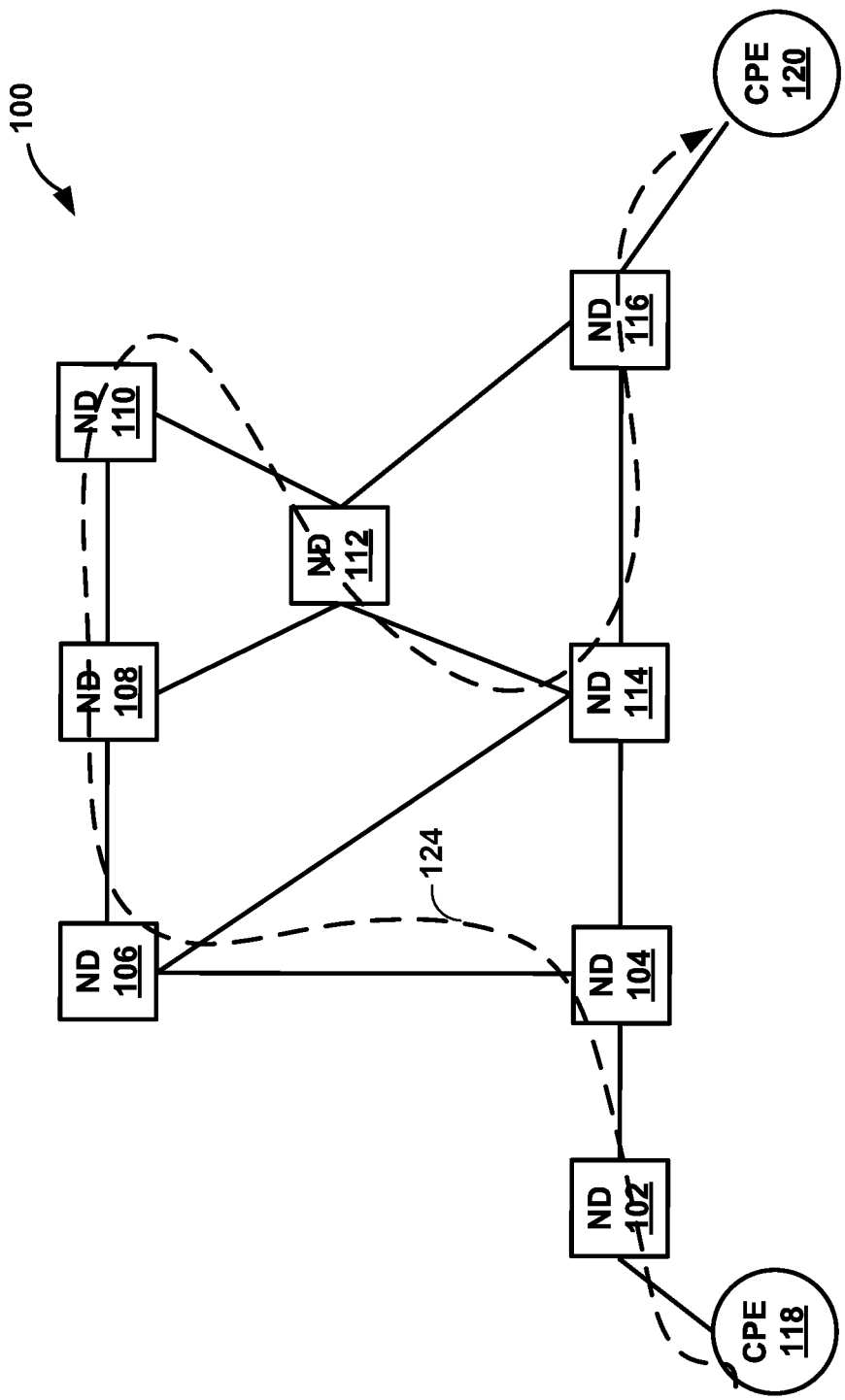
FIG. 1A is a block diagram illustrating an example network that supports the use of source packet routing in accordance with techniques described in this disclosure.

FIG. 1A is a block diagram illustrating an example network that supports the use of source packet routing in accordance with techniques described in this disclosure. Source packet routing, which may also be referred to as Segment Routing, is a control-plane architecture that enables an ingress router to steer a packet through a specific set of nodes and links in a network.

In the example of FIG. 1A, network 100 includes network devices (NDs) 102, 104, 106, 108, 110, 112, and 114. In some examples, the network devices of FIG. 1A may be routers. In some examples, network device 102 may be an ingress network device. The sources of the network traffic received by ingress network device may comprise one or more devices, such as customer premises equipment (CPE) 118 and/or any public or private network or the Internet that provides traffic to network device 102 in network 100. Furthermore, in some examples, network device 116 may be an egress network device. The destinations of the network traffic being forwarded on LSPs may comprise one or more destination devices, such as CPE 120 and/or networks that may include LANs or wide area networks (WANs) that comprise a plurality of devices. For example, destination devices may include personal computers, laptops, workstations, personal digital assistants (PDAs), wireless devices, network-ready appliances, file servers, print servers or other devices that access the source via network 100.

In the example of FIG. 1A, network devices may use segment routing techniques, e.g., Source Packet Routing in Networking (SPRING) protocol. For example, segment routing techniques are used to configure SIDs for paths from network device 102 to network device 116. Segment routing within an Internal Gateway Protocol (IGP) domain (e.g., network 100) allows network devices to advertise single or multi-hop LSPs within the IGP domain such as a segment routing LSP. In other words, segment routing may engage IGPs for advertising two types of network segments (e.g., tunnels). First, a strict-forwarded 1-hop tunnel that carries packets over a specific link between two nodes, irrespective of the link cost (hereafter shall be referred to as "adjacency segments"). Second, a multi-hop tunnel using shortest path links between two specific nodes or to a specific prefix (hereafter shall be referred to as "prefix segments"). Example IGPs include Intermediate System-Intermediate System (IS-IS) and Open Shortest Path First (OSPF).

Figure 4:
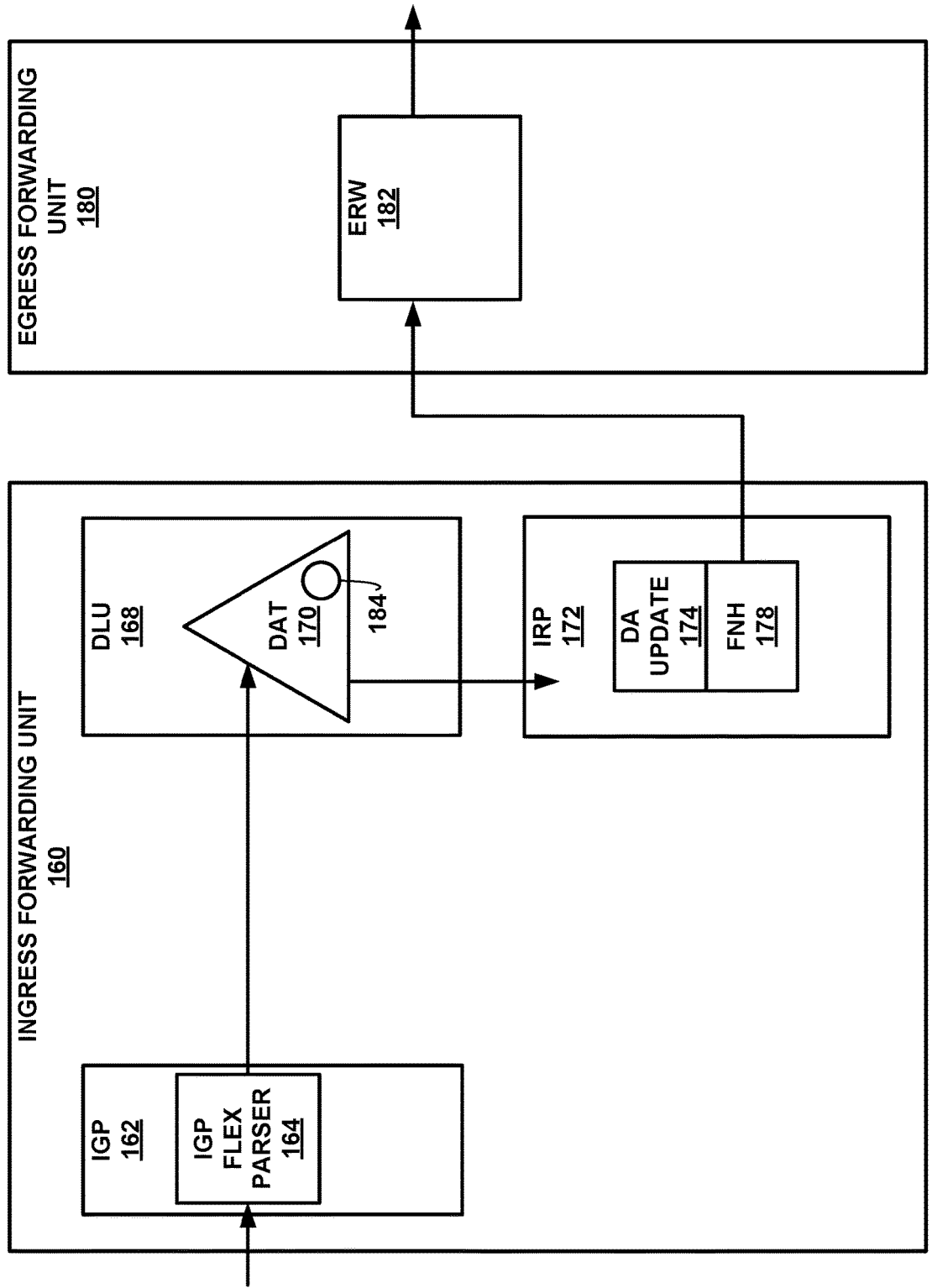
FIG. 4 is a conceptual diagram of an example process flow through an example ingress packet processor and egress packet processor of a network device in accordance with techniques described in this disclosure.

For segment routing within prefix segments, the "path" information is disseminated between the routers as part of the IGP link state information for the domain. Network device 102 is able to steer a packet through a controlled set of instructions, called segments, by prepending one or more segment identifiers (SIDs) to the packet. In other words, network device 102 can steer a packet through a desired set of nodes and links by prepending the packet with an appropriate combination (stack) of SIDs. Segment routing allows routers to enforce a flow through any topological path and service chain while maintaining per-flow state only at the ingress node to the segment routing domain. In some examples, network device 102 may prepend one or more micro SIDs, in addition to, or in lieu of prepending one or more SIDs to the packet. Micro SIDs are discussed more fully with respect to FIGS. 1B, 4, and 5.

One potential advantage of segment routing may be that the segment routing architecture can be directly applied to the Multi-protocol Label Switching (MPLS) data plane with no change in the forwarding plane. A network administrator need only allocate SIDs to particular routers and the segment routing IGP control-plane automatically builds the required MPLS forwarding constructs from a router to any other router. Segment routing is further described in Filsfils et. al., "Segment Routing Architecture," Internet-Draft draft-fils-fils-rtgwg-segment-routing-00, June 2013, while Segment Routing use cases are described in Filsfils et. al., "Segment Routing Use Cases," Internet-Draft draft-filsfils-rtgwg-segment-routing-use-cases-01, July 2013. Further details regarding SPRING are found in (1) "Segment Routing Architecture," IETF draft: draft-filsfils-spring-segment-routing-04, Jul. 3, 2014; (2) S. Previdi, et al., "Source Packet Routing in Networking (SPRING) Problem Statement and Requirements," RFC 7855, May 2017; and (3) "Segment Routing with MPLS data plane," IETF draft: draft-filsfils-spring-segment-routing-mpls-03, Aug. 1, 2014. Segment routing may also be implemented over IPv6 without the need for MPLS protocols. Segment routing over IPv6

(SRv6) may be beneficial in networks that are predominantly configured to utilize IPv6, but are not configured for MPLS.

Each of the network devices of FIG. 1A may be associated with a prefix. For instance, an administrator may assign prefixes to network devices. A prefix may be an address or block of addresses. The prefix corresponding to a node (e.g., a network device) may comprise an Internet Protocol (IP) address, block of IP addresses, or other type of data identifying the node. Additionally, one or more of the network devices of FIG. 1A may be configured with a SID. In some examples, the network devices of FIG. 1 are configured with prefixes and SIDs by manual configuration. A network device in network 100 may advertise its prefix and SID to other network devices in network 100. In other words, the network device may originate an advertisement specifying a prefix and a SID. For example, router 12D may advertise that its prefix is 2.2.2.33/32 and that its SID is 1063. To advertise a prefix, SID, a network device may send messages to neighboring network devices specifying the prefix and the SID. For example, network device 110 may send messages to network devices 108 and 112. In some examples, the advertisements are route advertisements, advertised by network devices using a routing protocol such as Intermediate System to Intermediate System (IS-IS), Open Shortest Path First (OSPF), or Border Gateway Protocol (BGP).

When a network device receives such an advertisement, the network device may forward the advertisement to neighboring routers. For example, if network device 108 receives an advertisement from network device 110, network device 108 may forward the advertisement to network device 106. In this way, eventually each of the network devices of FIG. 1 receives the advertisement. A network device that merely forwards an advertisement is not considered to originate the advertisement. Additionally, when a network device receives an advertisement, the network device determines whether the prefix specified in the advertisement is already associated with the SID specified in the advertisement. If this is the case and if the advertisement represents a new best path, the network device may update a routing table in response to the advertisement such that the routing table indicates a next hop in the route to the prefix. If the advertisement represents an equal cost compared to the existing route, the router may add an equal-cost multi-path (ECMP) next hop to the existing route.

Segment routing may be performed over IPv6, which may be called SRv6. With SRv6, a segment may be encoded in a header as an IPv6 address (e.g., a SID). A packet may include an ordered list of segments encoded as an ordered list of IPv6 addresses in a routing extension header. The segment to be processed by a network device may be indicated by a pointer (e.g., a segment left) in the header. When a segment is completed, a network device receiving the packet may change the pointer to point to the next IPv6 address (e.g., SID) in the ordered list of IPv6 addresses.

If the advertisement specifies a prefix and a SID that are not already in the network device's link state database (LSDB), the network device may calculate a route to the prefix specified in the advertisement. For example, if network device 106 receives an advertisement that specifies a prefix assigned to network device 110, network device 106 may calculate a route through network 100 to network device 110 (e.g., via network device 108). In some examples, the network device may calculate the route according to a shortest path algorithm or a strict shortest path algorithm. Furthermore, in some examples, an advertisement may specify the type of algorithm to use to calculate the route to the prefix specified in the advertisement. Additionally, the network device may associate the SID specified by the advertisement with the calculated route to the prefix specified by the advertisement. In other words, a network device may generate data that associate the SID with the route. The network device may then install the route as an active route. Installing a route as an active route may comprise generating forwarding information that a forwarding component of the network device may use to forward packets to next hops of routes associated with SIDs attached to the packets. For instance, installing the route as an active route may comprise generating information in a forwarding table that maps a SID to an interface card attached to a link to a next hop of the route associated with the SID.

After installing a route as an active route, a network device may receive a packet. In response to receiving the packet, the network device may determine whether the header includes a SID to which the pointer has not yet pointed. If there is no SID in the header to which the pointer has not yet pointed, the network device forwards the packet to another node in network 100 without further use of segment routing. For instance, the network device may forward the packet according to an IP address of the packet.

However, if the header includes one or more SIDs to which the pointer has not yet pointed, the network device may move the pointer to the next SID in the ordered list of SIDs to determine a next hop of a route associated with the active SID of the stack. The active SID may be the SID pointed to by the pointer. For instance, the active SID of a packet at an originating network device may be the SID occurring first in an ordered sequence of SIDs attached to the packet. If the next hop of the route associated with the active SID advertised the active SID, the network device of the next hop may move the pointer to point to the next SID specified in the packet header. For example, if network device 106 is assigned the SID "1063" and network device 106 receives a packet with the following SIDs attached, "1063" and "1040", network device 106 may move the pointer from pointing to 1063 to point to 1040.

The network device may then forward the packet, along with the remaining SIDs of the stack, to a next hop on the route associated with the active SID. For example, suppose network device 106 advertised a prefix equal to 2.2.2.33/32 and a SID equal to "1063." In this example, network device 102 may determine, based on network topology data stored by network device 102, a route to network device 106. In this example, the determined route may go from network device 102 to network device 104 to network device 106. Additionally, in this example, network device 102 may associate the determined route with the SID "1063." Subsequently, assuming that network device 106 was not itself assigned the SID "1063," if network device 102 receives a packet with an active SID equal to "1063," network device 102 may forward the packet to network device 104. Network device 104 performs a similar process to forward the packet to network device 106.

This system may allow a source node, such as network device 102, to control the path a packet takes through network 100. For example, suppose network device 102 is configured to send a packet to network device 116 via route 124 (shown with a dashed line) through network devices 104, 106, 108, 110, and 112. Furthermore, in this example, assume network device 106 is assigned the SID "1063" and network device 110 be assigned the SID "1062." Accordingly, in this example, network device 102 may receive an advertisement specifying a prefix of network device 106 and the SID "1063." Network device 102 then determines a route through network device 104 to network device 106 and associates the determined route with SID "1063." In this example, network device 102 may push the SID "1062" onto a stack of SIDs attached to the packet and may then push the SID "1063" onto the stack of SIDs attached to the packet. Network device 102 then sends the packet to a next hop on the route associated with the SID "1063" (i.e., network device 104). Network device 104 forward the packet in turn to network device 106 based on the SID "1063." Because SID "1063" matches the SID assigned to network device 106, network device 106 removes the SID "1063," leaving behind the SID "1062." Network device 106 then determines a route associated with the SID "1062." In this example, the route associated with the SID "1062" goes to network device 110 (through network device 108) because network device 106 received an advertisement that associates a prefix of network device 110 with the SID "1062." Thus, network device 102 is able to force the packet to go through network devices 104, 106, and 108 on the packet's way to network device 110, even though a shortest path from network device 102 to network device 1 might actually go through other network devices.

In some examples, instead of, or in addition to, using SIDs, network 100 may be configured to use micro SIDs. For example, network devices 102, 104, 106, 108, 110, 112, 114, and 116 of FIG. 1A may also be configured to be micro SID aware. A micro SID is an extension of an SR network programming model. In the micro SID model, rather than represent a given segment with a 16-byte long SID (such as is the case with a standard SR network), a micro SID may be used to represent a given segment. A micro SID may be of shorter length, such as 16 bits (2 bytes). Multiple micro SIDs may be located within a SID. For example, a given SID may carry up to 6 micro SIDs. By placing several micro SIDs within a given SID, a packet's overhead may be dramatically reduced when multiple segments are being traversed in a segment routing version 6 (SRv6) packet. In some examples, a first micro SID may be located in one SID and a second micro SID may be located in a different SID.

A micro SID may include a destination address and a function or action. For example, a micro SID may include a destination address and function of shifting the destination address left by a number of bits, such as 16 bits (2 bytes). When routing a packet having micro SIDs, a network device, such as network device 106, may left shift the remaining destination addresses such that a destination address that was second in the prefix is moved to a location in the header that was previously occupied by another destination address. In some examples, the function may also include adding an end of container identifier at the right end of the destination addresses. Thus, when handling an active SID having multiple micro SIDs, a network device, such as network device 106, may not move the pointer to the next SID as the network device may do for a SID because that may skip micro SIDs or destination addresses that are not associated with a current network device in the active SID which may result in the packet being routed through the network in an unintended manner. Instead, a network device may consume (e.g., remove) the destination address or micro SID associated therewith and left shift the remaining destination addresses or micro SIDs in the SID so that the next destination address or micro SID in the SID is located where the consumed destination address or micro SID was located immediately before consumption. Consuming the destination address or micro SID may include erasing the destination address or micro SID, writing over the destination address or micro SID or any other method which may result in the destination address or micro SID being removed from or not remaining in the SID or in the header. However, if a route entry were only to include one micro SID, a network device may have to perform more than one lookup in the destination address table prior to forwarding on the packet into the network.

According to the techniques of this disclosure, network device 106 may receive an advertisement originated by network device 110 in network 100. The advertisement may specify a second micro SID which may be associated with the network device 110. Network device 106 may store, in a destination lookup table of a forwarding unit (not shown in FIG. 1A) of network device 106, a route entry comprising a first micro SID associated with network device 106 and the second micro SID. For example, this route entry may be a single route entry including both the first micro SID and the second micro SID. In this manner, when network device 106 receives a packet having a first micro SID and a second micro SID in a top SID, network device 106 may perform a single lookup of the first micro SID and the second micro SID from the top SID (at one time) in the route entry within the destination address lookup table and route the packet into the network toward network device 110 without performing a second destination address table lookup for the second micro SID. By performing a single lookup of the first micro SID and the second micro SID, the time taken to process the packet by a given network device may be reduced, thereby improving overall latency of packet processing operations in the network. For example, according to the techniques of this disclosure, a network device may avoid recirculating a packet through a forwarding unit to perform a second lookup of a second micro SID.

Figure 1B:
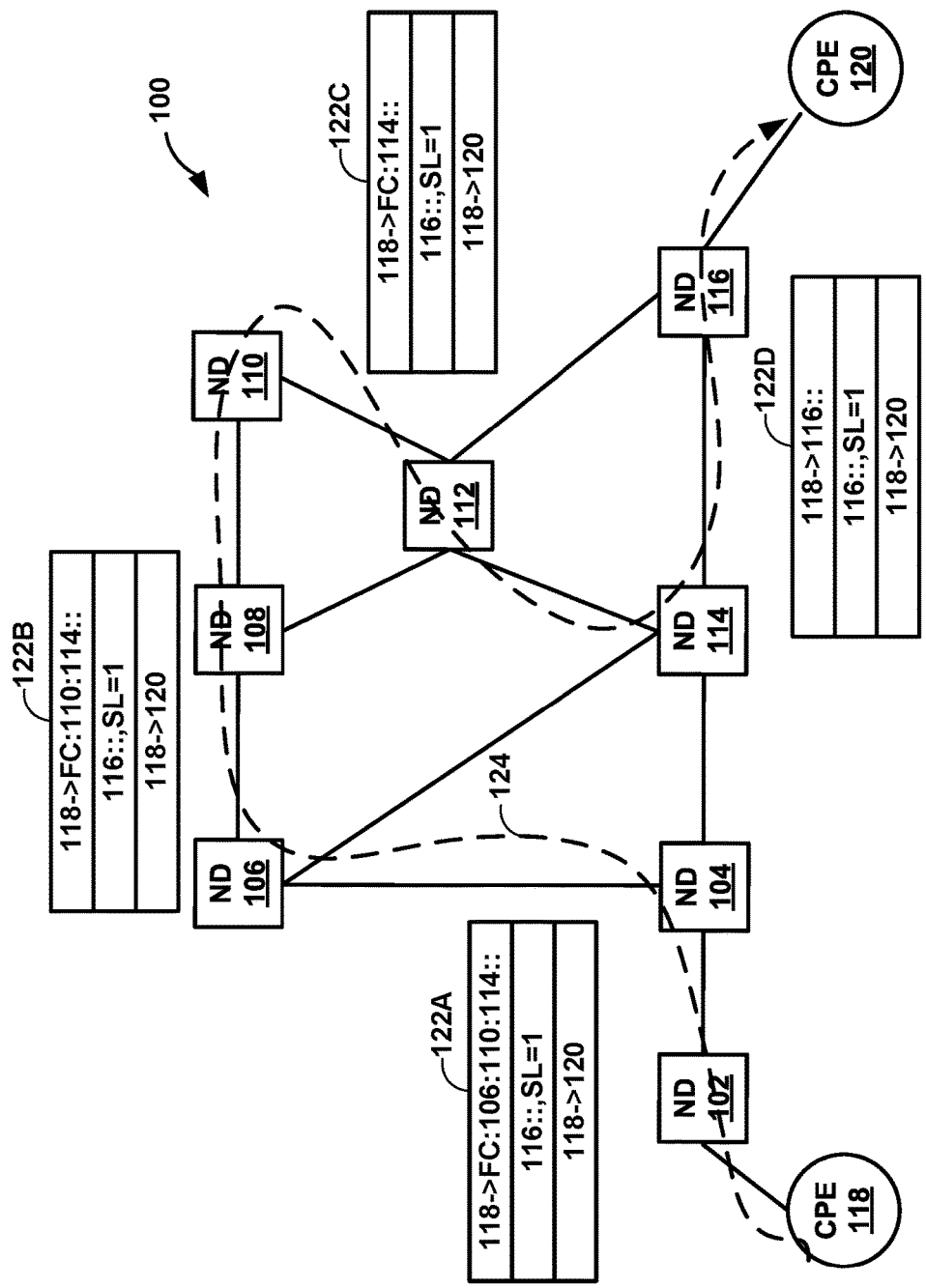
FIG. 1B is a block diagram illustrating an example network that supports micro SIDs and example packets in accordance with techniques described in this disclosure.

FIG. 1B is a block diagram illustrating an example network that supports the use of micro SIDs and example packets in accordance with techniques described in this disclosure. As in FIG. 1A, CPE 118 and CPE 120 are shown connected to network 100. CPE 118 may have data that is destined for CPE 120. As in FIG. 1A, network 100 includes network devices 102, 104, 106, 108, 110, 112, 114 and 116.

A flow of a packet through a micro SID aware network is now described. For example, CPE 118 may send the data bound for CPE 120 to network device 102 (which may be an example ingress router). Network device 102 may encapsulate the data sent by CPE 118 and apply one or more micro SIDs within a top SID as shown with packet 122A. For example, network device 102 may apply a micro SID(s) having destination addresses such as 118→FC:106:110:114::, an SR SID 116::, SL=1, and payload 118→120 (e.g., representing the data CPE 118 wants to send to CPE 120). Packet 122A may be sent through the network to the network device identified by the first destination address in the one or more micro SIDs. For example, packet 122A may be sent to network device 104. Network device 104 may determine that the network device identified by the first destination address in the one or more micro SIDs of packet 122A is network device 106. Network device 104 may store data specifying the location of network device 106 based on advertisements sent by network device 106 to network device 104. Network device 104 may route packet 122A to network device 106 as network device 106 matches the first network device destination address in the one or more micro SIDs of packet 122A. Network device 106 may determine that network device 106 is the first destination address identified in the one or more micro SIDs. Network device 106 may consume its identifier and left shift the destination addresses or micro SIDs by a predetermined or identified (e.g., in the micro SID) number of bits or bytes, such as 16 bits (2 bytes). The destination address of the one or more micro SIDs may now be 118→FC:110:114:: as shown in packet 122B.

NE 106 may forward packet 122B to network device 108 as network device 106 may store data specifying that network device 108 is between network device 106 and network device 110 based on advertisements sent by network device 110 and network device 108. Network device 108 may determine that the first destination address in the one or more micro SIDs of packet 122B is network device 110. Network device 108 may forward packet 122B to network device 110, as network device 108 may store data specifying the location of network device 110 based on advertisements sent by network device 110. Network device 110 may determine that network device 110 is the first destination address in the one or more micro SIDs of packet 122B. network device 110 may consume its identifier and shift the micro SID by the predetermined number of bits or bytes, such as 16 bits (2 bytes). The destination address of the one or more micro SIDs may now be 118→FC:114:: as shown in packet 122C.

Network device 110 may forward packet 122C to network device 112 as network device 110 may store data specifying that the next destination address in the one or more micro SIDs may be network device 114 and may store data specifying that network device 114 is connected to network device 112 based on advertisements sent by network device 114 and network device 112. Network device 112 may determine that the first destination address in the one or more micro SIDs of packet 122C is network device 114. Network device 112 may forward packet 122C to network device 114 as network device 112 may store data specifying the location of network device 114 based on advertisements sent by network device 114. Network device 114 may determine that network device 114 is the first destination address in the one or more micro SIDs of packet 122C. Network device 114 may consume its identifier and shift the micro SID by the predetermined or identified number of bits or bytes, such as 16 bits (2 bytes). As all the destination addresses in the one or more micro SIDs in the top SID may now be consumed, network device 114 may remove the top SID, resulting in the SR locator 118→116::SID being the top SID as is shown in packet 122D. Network device 114 may store data specifying the location of network device 116 based on advertisements sent by network device 116 and may forward packet 122D to network device 116. Network device 116 may de-encapsulate the data intended for CPE 120 and send the data to CPE 120. In this manner, micro SIDs may be used to reduce the packet overhead when compared to using only SIDs.

According to the techniques of this disclosure, a network device, such as network device 106 may receive an advertisement originated by network device 110 in network 100. The advertisement may specify a second micro SID which may be associated with the network device 110. Network device 106 may store, in a destination lookup table of a forwarding unit (not shown in FIG. 1B) of network device 106, a route entry comprising a first micro SID associated with network device 106 and the second micro SID. As mentioned above, this route entry may be a single route entry including both the first micro SID and the second micro SID.

In some examples, network device 106 may receive a packet comprising a header from network device 104 and determine whether at least a portion of the header matches the first micro SID and the second micro SID in the route entry. By determining whether at least a portion of the header (which may include the first micro SID and the second micro SID and which may be together in the header or separated by other bits) matches the first micro SID and the second micro SID in the route entry, network device 106 may avoid having to perform an additional lookup for the second micro SID. Network device 106 may remove the first micro SID from the header and shift the second micro SID in the header based on the at least a portion of the header matching the first micro SID and the second micro SID in the route entry to obtain an updated header that includes a shifted second micro SID. Network device 106 may forward the packet comprising the updated header into the network towards network device 110 based on the second micro SID in the header.

In this manner, when network device 106 receives a packet having a first micro SID and a second micro SID in a top SID, network device 106 may perform a single lookup of the first micro SID and the second micro SID from the top SID (at one time) in the route entry within the destination address lookup table and route the packet into the network toward network device 110 without performing a second destination address table lookup for the second micro SID.

Figure 2:
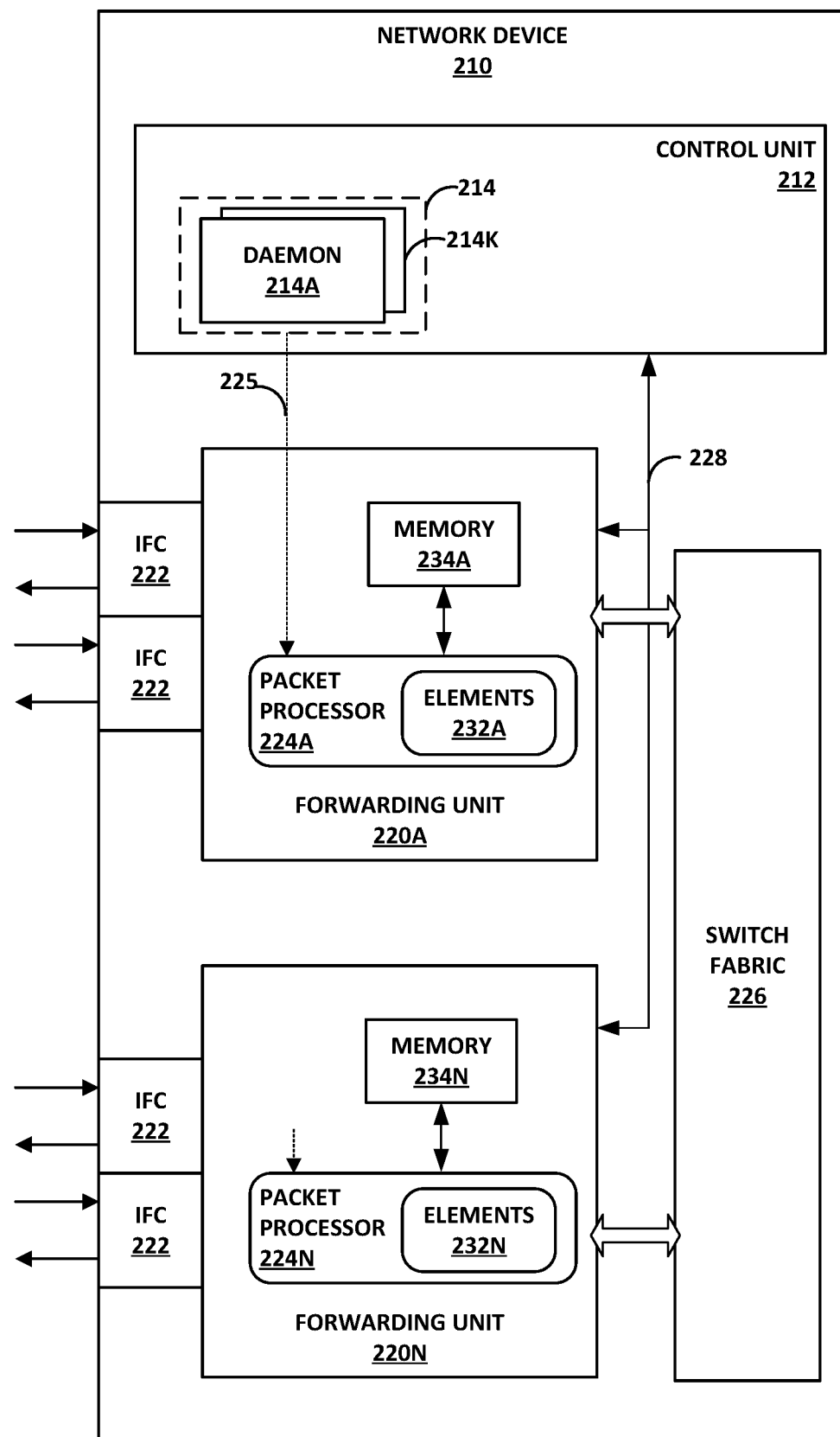
FIG. 2 is a block diagram illustrating an example network device in which one or more forwarding units are configured according to techniques described herein.

FIG. 2 is a block diagram illustrating an example network device in which one or more forwarding units are configured, according to techniques described herein. Network device 210 may include a router such as a provider edge or customer edge router, a core router, or another type of network device, such as a switch. Network device 210 may represent any of the network devices of FIGS. 1A and 1B.

In this example, network device 210 includes a control unit 212 that provides control plane functionality for network device 210. Network device 210 also includes a plurality of forwarding units 220A-220N ("forwarding units 220") and a switch fabric 226 that together provide a data plane for processing network traffic. Forwarding units 220 receive and send data packets via interfaces of interface cards 222A-222N ("IFCs 222") each associated with a respective one of forwarding units 220. Each of forwarding units 220 and its associated ones of IFCs 222 may represent a separate line card insertable within a chassis (not shown) of network device 210. Example line cards include flexible programmable integrated circuit (PIC) concentrators (FPCs), dense port concentrators (DPCs), and modular port concentrators (MPCs). Each of IFCs 222 may include interfaces for various combinations of layer two (L2) technologies, including Ethernet, Gigabit Ethernet (GigE), and Synchronous Optical Networking (SONET) interfaces, that provide an L2 interface for transporting network packets. In various aspects, each of forwarding units 220 may include more or fewer IFCs. Switch fabric 226 provides a high-speed interconnect among forwarding units 220 for forwarding incoming data packets to an egress forwarding unit of forwarding units 220 for output over a network that includes network device 210. In some examples, each of forwarding units 200 may include a memory, such as memories 234A-234N.

Control unit 212 is connected to each of forwarding units 220 by internal communication links 228. Internal communication links 228 may include a 100 Mbps Ethernet connection, for instance. Control unit 212 configures, by sending instructions and other configuration data via internal communication link 228, forwarding units 220 to define packet processing operations applied to packets received by forwarding units 220.

Control unit 212 executes a plurality of applications, including daemons 214A-214K ("daemons 214"). Each of the applications may represent a separate process managed by a control unit operating system. Daemons 214 may represent user-level processes that are developed and deployed by the manufacturer of the network device 210. As such, daemons 214 are "native" to the network device 210 in that the development of the applications is carefully managed by the manufacturer to facilitate secure, robust, and predictable operation of the network device 210, such operation defined at least in part according to a configuration specified by an operator (e.g., a service provider, enterprise, or other customer of the network device 210 manufacturer). Daemons 214 may run network management software, execute routing protocols to communicate with peer routing devices, maintain and update one or more routing tables, and create one or more forwarding tables for installation to forwarding units 220, among other functions. In some examples, according to the techniques of this disclosure, one or more of daemons 214 may be configured to install one or more route entries in a destination lookup table (not shown in FIG. 2) of forwarding unit 220A that include a destination address associated with network device 210 and another destination address associated with another network device based on advertisements received from that other network device as discussed above with respect to FIG. 2. These destination addresses may be in the form of micro SIDs.

Control unit 212 may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 212 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Each forwarding unit of forwarding units 220 includes at least one packet processor 224 that processes packets by performing a series of operations on each packet over respective internal packet forwarding paths as the packets traverse the internal architecture of network device 210. Packet processor 224A of forwarding unit 220A, for instance, includes one or more configurable hardware chips (e.g., a chipset) that, when configured by applications executing on control unit 212, define the operations to be performed by packets received by forwarding unit 220. Each chipset may, in some examples, represent a "packet forwarding engine" (PFE). Each chipset may include different chips each having a specialized function, such as queuing, buffering, interfacing, and lookup/packet processing. Each of the chips may represent application specific integrated circuit (ASIC)-based, field programmable gate array (FPGA)-based, or other programmable hardware logic. A single forwarding unit 220 may include one or more packet processors 224.

Operations may be performed, for example, on each packet by any of a corresponding ingress interface, an ingress forwarding unit, an egress forwarding unit, an egress interface or other components of network device 210 to which the packet is directed prior to egress, such as one or more service cards. Packet processors 224 process packets to identify packet properties and perform actions bound to the properties. Each of packet processors 224 includes forwarding path elements that, when executed, cause the packet processor to examine the contents of each packet (or another packet property, e.g., incoming interface) and on that basis make forwarding decisions, apply filters, and/or perform accounting, management, traffic analysis, and load balancing, for example. In one example, each of packet processors 224 arranges forwarding path elements as next hop data that can be chained together as a series of "hops" in a forwarding topology along an internal packet forwarding path for the network device. The result of packet processing determines the manner in which a packet is forwarded or otherwise processed by packet processors 224 of forwarding units 220 from its input interface on one of IFCs 222 to, at least in some cases, its output interface on one of IFCs 222.

In many instances, the forwarding path elements perform lookup operations, such as a tree (or trie) search, a table (or index) search, a filter determination and application, or a rate limiter determination and application. Lookup operations locate, within a lookup data structure (e.g., a lookup tree), an item that matches packet contents or another property of the packet or packet flow, such as the inbound interface of the packet. In some examples, according to the techniques of this disclosure, lookup operations may include looking up a prefix in a destination address table. This prefix may include a destination address associated with network device 210 and one or more other destination addresses associated with one or more other respective network devices.

Applications configured for execution by control unit 212 determine the packet processing operations to be applied to packets by packet processors 224. In the example network device of FIG. 2, applications include daemons 214. Applications configure the packet processors 224 to perform the packet processing operations by sending, to forwarding units 220, data representing the packet processing operations. Such data may include forwarding path elements representing high-level packet processing requirements (e.g., route lookup and filtering). Packet processing operations may include fundamental packet forwarding operations such as input packet processing, route lookup, and output packet processing, as well as service functions such as packet filtering or access control, statistical sampling, traffic policing, rate limiting, and accounting.

Packet processors 224 execute the forwarding path elements 232 to process received packets to satisfy the high-level packet processing requirements provided by the application. In this way, the applications may inject higher-level representations of routes and next-hops (operations) into the stream of configurable forwarding state that is stored by packet processors and that defines, at least in part, the packet processing operations for execution by packet processors 224. Because forwarding path elements 232 may resolve to other forwarding path elements 232, forwarding path elements 232 may be chained together to define a set of packet processing operations for a given packet and form a "forwarding path" for that packet. The set of forwarding path elements 232 and forwarding state for execution and use by packet processors 224 may therefore alternatively be referred to as the forwarding path or internal forwarding path for a given packet processor 224, forwarding unit 220, or the network device 210 as a whole.

According to the techniques of this disclosure, network device 210 may include control unit 212 configured to execute at least one application, such as daemon 214A and forwarding unit 220A. Forwarding unit 220A may include an interface (e.g., IFC 222) configured to receive packets, at least one packet processor (e.g., packet processor 224A) operably coupled to a memory (e.g., memory 234A which may be located in forwarding unit 220A or elsewhere in network device 210), and a forwarding path (not shown in FIG. 2). At least a portion of the forwarding path is stored in the memory and is executable by the at least one packet processor. The forwarding unit is configured to receive an advertisement originated by a second network device in a network. The advertisement specifies a second micro SID. The forwarding unit is also configured to store, in a destination lookup table (not shown in FIG. 2), a route entry comprising a first micro SID associated with the network device 210 and the second micro SID. For example, this route entry may be a single route entry having both the first micro SID and the second micro SID. In this manner, when network device 210 receives a packet having a first micro SID and a second micro SID in a top SID, network device 210 may perform a single lookup of the first micro SID and the second micro SID in the top SID in the destination address lookup table and route the packet into the network toward the second network device without performing a second destination address table lookup for the second micro SID.

Hereinafter, the techniques are described with respect to forwarding unit 220A. A forwarding path element may be of a type to perform a simple action (such as a counter or discard), a conditional, or a complex construct such as a table, tree, or lookup. Each node instance may have a type that corresponds to the type of forwarding path element (e.g., action, tree, etc.)

Figure 3:
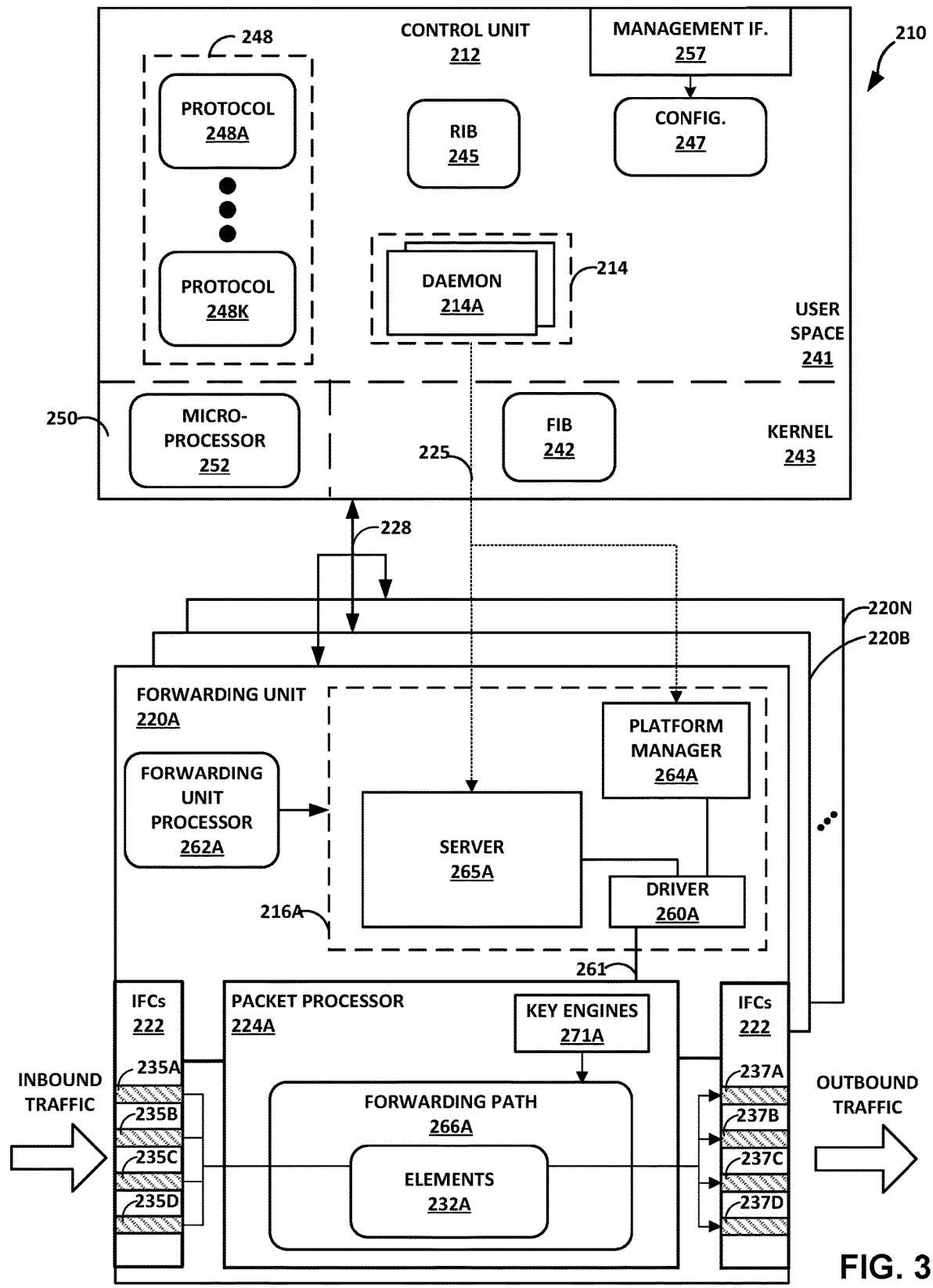
FIG. 3 is a block diagram illustrating, in further detail, an example network device in which a forwarding unit is configured, according to techniques described herein.

FIG. 3 is a block diagram illustrating, in further detail, an example network device in which a forwarding unit is configured, according to techniques described herein. Network device 210 illustrated in FIG. 3 may represent an example instance of network device 210 of FIG. 2.

In this example, control unit 212 includes a combination of hardware and software that provides a control plane operating environment for execution of various user-level host applications executing in user space 241. By way of example, host applications may include a management interface process 257 having a command-line interface and/or graphical user interface process to receive and respond to administrative directives, a routing protocol process of daemons 214 to execute one or more routing protocols of protocols 248A-248K (collectively, "protocols 248"), a network management process of daemons 214 to execute one or more network management protocols of protocols, an ARP process of daemons 214 to respond to ARP requests according the ARP protocol of protocols 248, a subscriber management process of daemons 214 to manage subscriber session setup and maintenance in accordance with one or more subscriber session management protocols (e.g., GPRS Tunneling Protocol-C(ontrol)), and so forth. In this respect, control unit 212 may provide routing plane, service plane, and management plane functionality for network device 210. Control units 212 may be distributed among multiple control units.

Daemons 214 and management interface 257 execute on and interact with kernel 243, which provides a run-time operating environment for user-level processes. Kernel 243 may represent, for example, a UNIX operating system derivative such as Linux. Kernel 243 offers libraries and drivers by which user-level processes may interact with the underlying system. Hardware environment 250 of control unit 212 includes microprocessor 252 that executes program instructions loaded into a main memory (not shown in FIG. 3) from a storage device (also not shown in FIG. 3) in order to execute the software stack, including both kernel 243 and user space 241, of control unit 212. Microprocessor 252 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In this example, a routing protocol process of daemons 214 executes one or more interior and/or exterior routing protocols to exchange routing information with other network devices and store received routing information in routing information base 245 ("RIB 245"). RIB 245 may include information defining a topology of a network, including one or more routing tables and/or link-state databases. The routing protocol process resolves the topology defined by routing information in RIB 245 to select or determine one or more active routes through the network and then installs these routes to forwarding information base 242 ("FIB 242") of kernel 243. Typically, the routing protocol process generates FIB 242 in the form of a radix or other lookup tree to map packet information (e.g., header information having destination information and/or a label stack) to next hop devices and ultimately to interface ports of interface cards associated with respective forwarding units 220A-220N. Each of forwarding units 220 may be programmed with a different FIB.

Network device 210 also includes a plurality of forwarding units 220A-220N (collectively, "forwarding units 220") and a switch fabric (not shown) that together provide a data plane for forwarding network traffic. Forwarding units 220 connect to control unit 212 in this example by communication links 223, which may represent an Ethernet network.

Each of forwarding units 220 may include substantially similar components performing substantially similar functionality, said components and functionality being described hereinafter primarily with respect to forwarding unit 220A. Forwarding unit 220A receives and sends network packets via inbound interfaces 235 and outbound interfaces 237, respectively, of interface cards (IFCs) 222 of forwarding unit 220A. Forwarding unit 220A also includes packet processor 24A, which represents hardware or a combination of hardware and software that provide high-speed forwarding of network traffic. Likewise, forwarding unit 220B includes packet processor 224B, and so on. In some examples, one or more of forwarding units 220 may each include multiple packet processors substantially similar to packet processor 224A.

Each of IFCs 222 may include interfaces for various combinations of layer two (L2) technologies, including Ethernet, Gigabit Ethernet (GigE), and Synchronous Optical Networking (SONET) interfaces. In various aspects, each of forwarding units 220 may include more or fewer IFCs. In some examples, each of packet processors 224 is associated with different IFCs of the forwarding unit on which the packet processor is located. The switch fabric (not shown in FIG. 3) connecting forwarding units 220 provides a high-speed interconnect for forwarding incoming transit network packets to the selected one of forwarding units 220 for output over one of IFCs 222.

Network device 210 may in some instances represent a multi-chassis router, and the switch fabric may include a multi-stage switch fabric, such as a 3-stage Clos switch fabric, that relays packet-switched communications and circuit-switched communications between the routing nodes of the multi-chassis router via optical interconnects using multiplexed communications. Forwarding units 220A-220N of network device 210 demarcate control plane and data plane of network device 210. That is, forwarding unit 220A performs control plane and data plane functionality. In general, packet processor 224A and IFCs 222 implement a data plane for forwarding unit 220A, while packet processor driver 260A that implement portions of the network device 210 control plane within forwarding unit 220A. Control unit 212 also implements portions of the control plane of network device 210. Forwarding unit processor 262A of forwarding unit 220A manages packet processor 224A and executes instructions to provide interfaces to control unit 212 and handle host-bound or other local network packets (such as packets that include Options Field values or TTL-expired packets). Forwarding unit processor 262A may execute a microkernel for forwarding unit 220A. The microkernel executed by forwarding unit processor 262A may provide a multi-threaded execution environment for executing modules of packet processor driver 260.

Packet processor 224A may include programmable ASIC-based, FPGA-based, or other types of packet processors that process network packets by performing a series of operations on each packet over respective internal packet forwarding paths as the packets traverse the internal architecture of network device 210. Packet processor 224A includes forwarding path elements 232A that, in general, when executed, examine the contents of each packet (or another packet property, e.g., incoming interface) and on that basis make forwarding decisions, apply filters, and/or perform accounting, management, traffic analysis, and load balancing, for example. In one example, packet processor 224A arranges forwarding path elements as next hop data that can be chained together as a series of "next hops" along an internal packet forwarding path 266A ("forwarding path 266A") for the packet processor 224A. The result of packet processing determines the manner in which a packet is forwarded or otherwise processed by packet processors 224 of forwarding units 220 from the packet's input interface on an ingress forwarding unit of forwarding units 220 to its output interface on an egress forwarding unit of forwarding units 220.

In some examples, according to the techniques of this disclosure, packet processor 224A may insert a route entry into FIB 242 including a destination address associated with network device 210 and one or more other destination addresses associated with one or more other network devices. In some examples, packet processor may look up destination addresses in the route entry and left shift the destination addresses as discussed above.

Packet processor 224A identifies packet properties and performs actions bound to the properties. One or more key engines 271A of packet processor 224A execute microcode (or "microinstructions") of the forwarding path elements to control and apply fixed hardware components of the forwarding path to process packet "keys." A packet key includes packet fields and other parameters that determine a flow of packet processing for the packet along an internal forwarding path. Internal forwarding path 266A ("forwarding path 266A") may represent a computer-readable storage medium, such as random access memory, and includes forwarding path elements in the form of programmable, executable microcode and fixed hardware components that determine the packet processing actions and other operations performed by packet processor 224A. Forwarding path 266A may include, for example, executable instructions, programmable logic, and application-specific logic that perform lookups, rate limit packet flows (e.g., using policers), and manipulate packet keys, among other functions. Forwarding path elements may include primitives such as lookup tables and lookup trees, along with rate limiters, policers, counters, firewalls, and other elements.

Internal forwarding paths of network device 210 may include combinations of respective forwarding paths 266 of multiple different packet processors 224. In other words, forwarding path 266A of packet processor 224A may include only a part of the overall internal forwarding path of network device 210. Control unit 212 may configure forwarding path 266A of packet processor 224A to identify host-bound network packets and forward such packets toward control unit 212. For example, control unit 212 may program filters that include a network address of a network device 210 and direct packet processor 224A to forward network packets having a destination address that matches the network address toward control unit 212.

In some examples, packet processor 224A binds actions to be performed on packets received by the packet processor 224A to identification of one or more properties of the packets. That is, upon identifying certain packet properties, packet processor 224A performs the action bound to the properties. Packet properties may include packet metadata such as a particular packet's ingress interface or egress interface (as determined by the packet processors 224) as well as information carried by the packet and packet header, such as packet header fields, destination route prefixes, layer four (L4) or Transport Layer protocol destination ports, and the packet payload. Actions bound to packet characteristics may include count, discard, forward to a specified forwarding path element or interface, filter, sample, rate limit, and Quality of Service (QoS) marking, differential services (DiffServ), load balance, intrusion detection and prevention, L2 class of service (CoS), and L2 or L2 Virtual Private Network (L2VPN) switching.

Each of key engines 271A includes one or more key buffers to store packet field data for corresponding packets that the key engine is currently processing. Key buffers may also provide limited writable memory to which elements of the internal forwarding path may write to pass messages accessible by future elements.

Forwarding path elements 232A (also referred to as "primitives") of forwarding path 266A include data structures having entries, or "items," that correspond to packet key values and bind the values to actions to be performed by key engines 271A executing forwarding path 266A. In this respect, at least some of forwarding path elements 232A represent a tightly-coupled combination of executable instructions that correspond to bound actions and of data for possible packet key values. A tree lookup one of forwarding path elements 232A may perform a longest-match prefix lookup in a routing table or search a list of prefixes in a filter program. A table lookup one of forwarding path elements 232A may determine whether another one of forwarding path elements 232A should be performed by key engines 271A. For example, a key engine 271A may perform a table lookup of packet properties to determine that key engines 271A should further perform a tree lookup to identify an outbound interface for the packet. Packet processor 224A may store forwarding path elements 232A in computer-readable storage media, such as static random access memory (SRAM). While illustrated within packet processor 224A, forwarding path elements 232A may be stored in memory external and accessible to packet processor 224A.

In some aspects, actions of forwarding path 266 use a forwarding path element data structure to initiate processing. At the end of each processing step by one of key engines 271A, such as execution of one of a forwarding path element 232A, the result is a forwarding path element that may specify additional processing or the termination of processing, for instance. In addition, forwarding path elements may specify or otherwise represent one or more functions to be executed by key engines 271A. Example forwarding path element functions include policing (i.e., rate limiting), counting, and sampling. Forwarding path elements thus form the primary data structure that can be used to initiate a lookup or another forwarding path element, chain lookups and forwarding path elements together to allow for multiple lookup and other operations to be performed on a single packet, and terminate a lookup. Key engines 271 may be associated with respective result (or "lookup") buffers that store results for executing forwarding path elements. For example, a key engine 271 may execute a lookup specified by a forwarding path element and store the result of the lookup to the associated result buffer. The contents of a result buffer may affect the actions of the forwarding path element in the forwarding topology.

Forwarding unit 220A receives inbound network traffic by IFCs 222, and packet processor 224A processes network traffic using internal forwarding path 266A. Packet processor 224A looks up outbound interfaces for and forwards transit network packets that are neither host-bound nor otherwise require a response of logical decision by the control plane as outbound traffic via outbound interfaces 237.

Forwarding unit 220A presents interfaces to control unit 212 for configuring forwarding path 266A. Server 265A presents an application programming interface (API) to create forwarding path elements 232A in forwarding path 266A by creating, referencing, and connecting forwarding path elements 232A Packet processor driver 260A (hereinafter, "driver 260A"), configured for execution by forwarding unit processor 262A, configures forwarding path 266A with forwarding path elements 232A for execution by packet processor 224A. Packet processor driver 260A receives forwarding path elements 232A from server 265A and platform manager 264A. Forwarding path elements 232A may include instructions executable by packet processor 224A.

According to the techniques of this disclosure, network device 210 may include control unit 212 configured to execute at least one application, such as daemon 214A, and forwarding unit 220A. Forwarding unit 220A may include an interface (e.g., IFC 222) configured to receive packets, at least one packet processor (e.g., packet processor 224A) operably coupled to a memory (e.g., memory 234A of FIG. 2), and a forwarding path (e.g., 266A). At least a portion of the forwarding path is stored in the memory and is executable by the at least one packet processor. Forwarding unit 220A may be configured to receive an advertisement originated by a second network device in a network. The advertisement specifies a second micro SID. Forwarding unit 220A is also configured to store, in a destination lookup table (not shown in FIG. 3) of forwarding unit 220A, a route entry comprising a first micro SID associated with the network device 210 and the second micro SID. For example, this route entry may be a single route entry including both the first micro SID and the second micro SID. In this manner, when network device 210 receives a packet having a first micro SID and a second micro SID in a top SID, network device 210 may perform a single lookup of the first micro SID and the second micro SID in the top SID in the destination address lookup table and route the packet into the network toward the second network device without performing a second destination address table lookup for the second micro SID.

Figure 5:
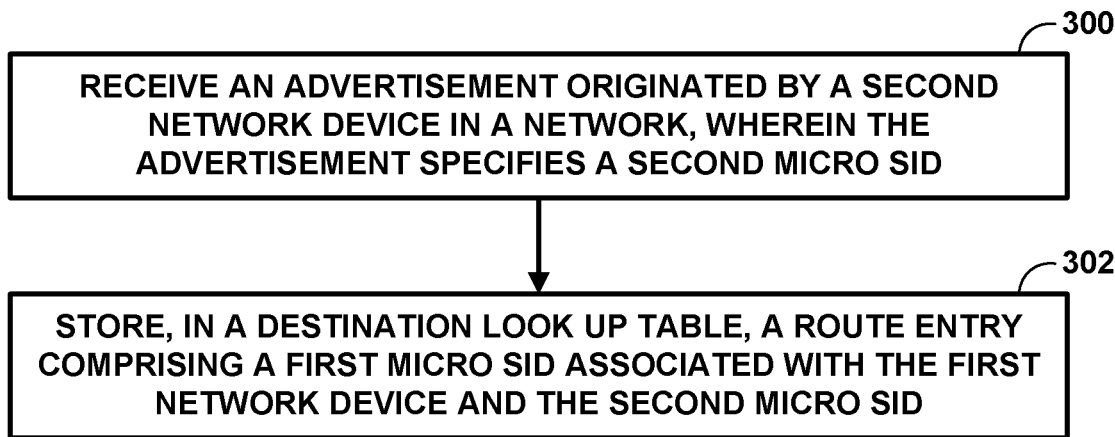
FIG. 5 is a flowchart illustrating micro SID techniques in accordance with this disclosure.

FIG. 5 is a conceptual diagram of an example process flow through an example ingress forwarding unit and egress forwarding unit of a network device in accordance with techniques described in this disclosure. Ingress forwarding unit 160 and egress forwarding unit 180 may be examples of forwarding units 220. For the purposes of explanation, ingress forwarding unit 160 and egress forwarding unit 180 may be discussed as being forwarding units of network device 106 of FIGS. 1A and 1B.

In the absence of the techniques of this disclosure, ingress forwarding units, such as ingress forwarding unit 160, would have to process a packet having one or more micro SIDs in a top SID twice before sending the packet to an egress forwarding unit, such as egress forwarding unit 180. For example, IGP unit 162 may have received an incoming packet having one or more micro SIDs in a top SID. IGP flex parser 164 may have extracted a number of bytes of the packet for further processing by ingress processing unit 160. DLU 168 may have looked up the first destination listed in the one or more micro SIDs from the bytes extracted by IGP flex parser 164 in destination address table (DAT) 170 which may be a lookup table.

DLU 168 may have determined that the first destination listed in the one or more micro SIDs of the top SID is network device 106 and matches its own identifier. DLU 168 may then have forwarded packet 122A to ingress results parser (IRP) 172. Destination address (DA) Update 174 may have consumed the first destination address or micro SID (e.g., remove the first destination address or micro SID from the top SID) and shifted the remaining destination addresses or micro SIDs as discussed above with respect to FIG. 2. A recirculator of IRP 172 (not shown) would then have recirculated the altered packet (e.g., now packet 122B, rather than packet 122A) back through at least some elements of ingress forwarding unit 160 such as IGP flex parser 164 of IGP unit 162, SLU 166, and/or DLU 168 to look up the next destination address in the one or more micro SIDs. DLU 168 may then have determined that the first destination listed in the micro SID of packet 122B is the SID of network device 110. DLU 168 may have forwarded packet 122B to IRP 172. Forwarding next hop (FNH) 178 may then have forwarded packet 122B to egress forwarding unit 180. Egress rewrite processor (ERW) 182 may then have forwarded packet 122B to network device 108 (of FIG. 2). As described, this process includes two passes through at least some of IGP unit 162, SLU 166, DLU 168, and/or IRP 172 prior to forwarding the packet to egress forwarding unit 180. As such, the processing power expended by the network device and processing time taken by the network device may not be optimal.

According to the techniques of this disclosure, ingress forwarding unit 160 may process an incoming packet having one or more micro SIDs in the top layer once rather than twice (once on the incoming destination address and a second time on the modified prefix lookup) and line-rate packet processing may be satisfied as the lookup can be performed within the time requirement of a regular forwarding path.

For example, ingress forwarding unit 160 may receive packet 122A (FIG. 2). IGP flex parser 164 of IGP unit 162 extract a number of bytes of the packet for further processing by ingress processing unit 160. DLU 168 may look up the first destination listed in the micro SID(s) from the bytes extracted by IGP flex parser 164 in DAT 170.

DLU 168 may determine that the first destination listed in the micro SID is network device 106 and matches its own SID. DLU 168 may also have previously stored FC:106::/96 as its SID. Additionally, based on advertisements from network device 110 and network device 114, DLU may have stored FC:106:110::/96 as a shift and locator for network device 110 and FC:106:114::/96 as a shift and locator for network device 114. Based on the first two network addresses in the one or more micro SIDs in the top SID matching network device 106 and network device 110, DLU may then forward packet 122A to ingress results parser (IRP) 172. Destination address (DA) Update 174 may consume the first destination address or micro SID (e.g., remove the first destination address or micro SID from the top layer) and/or perform the shifting of the remaining destination addresses or micro SIDs as discussed with respect to FIG. 2 and FNH 178 may forward the shifted packet (now packet 122B) to egress forwarding unit 180. Egress rewrite processor (ERW) 182 may then forward packet 122B to network device 108 (of FIG. 2). As can be seen, this technique only requires a single pass through IGP unit 162, SLU 166, DLU 168, and IRP 172 prior to forwarding the packet to egress forwarding unit 180 and may be more processing power efficient and more time efficient than the process discussed above having two passes through IGP unit 162, SLU 166, DLU 168, and IRP 172.

For example, at network device 106, when network device 106 receives advertisements from network device 110 such as (FC:110::) and from network device 114 such as (FC:114::), network device 106 may store the following route entries in DAT 170: FC:106:110::/96→<Shift the destination address> and forward along shortest path to FC:110::/96 and FC:106:114::/96→<Shift the destination address> and forward along shortest path to FC:114::/96.

For example, a first network device (e.g., network device 106 of FIGS. 1A-1B) may include a control unit (e.g., control unit 212 of FIG. 2) configured to execute at least one application (e.g., daemon 214A of FIG. 2) and a forwarding unit (e.g., forwarding unit 220A of FIG. 2). The forwarding unit may include an interface (e.g., IFC 222 of FIG. 2) configured to receive packets, at least one packet processor (e.g., packet processor 224A of FIG. 2) operably coupled to a memory (e.g., memory 234A of FIG. 2) and a forwarding path (e.g., forwarding path 266A of FIG. 4), wherein at least a portion of the forwarding path is stored in the memory and is executable by the at least one packet processor. The forwarding unit may be configured to receive an advertisement originated by a second network device wherein the advertisement specifies a second SID. The forwarding unit may also be configured to store, in a destination lookup table (e.g., DAT 170) of the forwarding unit, a route entry 184 comprising a first micro SID associated with the first network device and the second micro SID. For example, ingress forwarding unit 160 may store route entry 184 including FC:106:110::/96. In some examples, route entry 184 may include one or more actions to be performed on a packet bearing the first micro SID or the second micro SID, such as a shift of the second micro SID and/or a forward of the packet along a shortest path to the second network device.

For example, route entry 184 may include FC:106:110::/96→<Shift the destination address> and forward along shortest path to FC:110::/96.

In some examples, the forwarding unit may be configured to receive a packet comprising a header and determine whether at least a portion of the header matches the first micro SID and the second micro SID in route entry 184. The forwarding unit may be configured to remove the first micro SID from the header and shift the second micro SID in the header based on the at least a portion of the header matching the first micro SID and the second micro SID in route entry 184 to obtain an updated header that includes a shifted second micro SID. The forwarding unit may also be configured to forward the packet comprising the updated header into the network towards the second network device based on the second micro SID in the header.

For example, as part of forwarding the packet including the updated header, the forwarding unit may be configured to forward the packet comprising the updated header without performing a lookup in the destination table of the updated header. In some examples, as part of the shift, the forwarding unit is configured to move the second micro SID to a previous location of the first micro SID in the header. In some examples, the forwarding unit is an ingress forwarding unit and wherein as part of forwarding the packet including the updated header, the ingress forwarding unit is configured to forward the packet comprising the updated header to an egress forwarding unit to forward into the network.

FIG. 6 is a flowchart illustrating micro SID techniques in accordance with this disclosure. A first network device may receive an advertisement originated by a second network device in a network, wherein the advertisement specifies a second micro SID (300). For example, ingress forwarding unit 160 of the first network device (e.g., network device 106 of FIGS. 1A-1B) may receive an advertisement from a second network device (e.g., network device 110 of FIGS. 1A-1B). The advertisement may specify the second micro SID which may be associated with the second network device. The first network device may store in a destination lookup table of a forwarding unit of the first network device, a route entry (e.g., route entry 184 of FIG. 5) comprising a first micro SID associated with the first network device and the second micro SID and (302). For example, ingress forwarding unit 160 of the first network device may store a route entry including both the first micro SID associated with the first network device and the second micro SID. For example, ingress forwarding unit 160 may store a route entry including FC:106:110::/96. In some examples, route entry 184 may include one or more actions to be performed on a packet bearing the first micro SID or the second micro SID, such as a shift of the second micro SID and/or a forward of the packet along a shortest path to the second network device. For example, the route entry may include FC:106:110::/96→<Shift the destination address> and forward along shortest path to FC:110::/96.

In some examples, the first network device may receive, at an ingress forwarding unit, a packet comprising a header. For example, ingress forwarding unit 160 may receive a packet having a header which may include 118→FC:106:110:114::. The first network device may determine whether at least a portion of the header matches the first micro SID and the second micro SID in the route entry. For example, ingress forwarding unit 160 may look up the combination of the first micro SID and the second micro SID appearing in the header and compare them to the route entry to determine if at least a portion of the header matches the first micro SID and the second micro SID in route entry 184. For example, ingress forwarding unit 160 may compare at least a portion of header 118→FC:106:110:114:: to the first micro SID and the second micro SID in the route entry FC:106:110::/96.

In some examples, based on the at least a portion of the header matching the first micro SID and the second micro SID in the route entry, the first network device may remove the first micro SID from the header and shift a position of the second micro SID in the header to obtain an updated header that includes the shifted second micro SID. For example, ingress forwarding unit 160 may consume the first micro SID and shift the second micro SID in the header into a location previously occupied by the first micro SID. For example, ingress forwarding unit 160 may change the header to be 118→FC:110:114::. For example, ingress forwarding unit 160 may move the second micro SID such that the second micro SID is at or near the beginning of the header, before any other micro SIDS in the header. Based on the second micro SID in the header, the first network device may forward into the network towards the second network device, the packet comprising the updated header. For example, ingress forwarding unit 160 may forward the packet including the updated header to egress forwarding unit 180 and egress forwarding unit 180 may forward the packet into network 100 (of FIGS. 1A-1B) towards the second network device.

In some examples, as part of forwarding the packet comprising the updated header, the forwarding unit is configured to forward the packet comprising the updated header without performing a lookup in the destination lookup table of the updated header. For example, ingress forwarding unit 160 may not attempt to match at least a portion of the updated header with a route entry in DAT 170. For example, ingress forwarding unit 160 may forward the packet to egress forwarding unit 180 without sending the packet back to IGP unit 162, source lookup unit 166, destination lookup unit 168, or ingress results parser 172 (all of FIG. 4). In some examples, the forwarding path of ingress forwarding unit 160 comprises at least one of IGP flex parser 164, source lookup unit 166, destination lookup unit 168, or ingress results parser 172.

In some examples, the first micro SID and the second micro SID each has a length of 16 bits. In some examples, the shifting moves the second micro SID to a previous location of the first micro SID in the header. In some examples, the forwarding the packet comprising the updated header into the network comprises forwarding the packet comprising the updated header to an egress forwarding unit for the egress forwarding unit to forward into the network. In some examples, the packet is configured based on internet protocol version 6. In some examples, the destination lookup table supports internet protocol version 6.

The techniques described herein may be implemented in hardware, software, firmware, or any combination thereof. Various features described as components, units or modules may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software components or hardware components.

Various aspects of the techniques have been described. These and other aspects are within the scope of the following claims.

What is claimed is:

1. A method comprising:
    receiving, by a first network device in a network, an advertisement originated by a second network device in the network, wherein the advertisement specifies a second micro segment identifier (SID) associated with the second network device; and
    storing, by the first network device, in a destination lookup table of the first network device, a route entry comprising both a first micro SID associated with the first network device and the second micro SID to enable a determination of whether at least a portion of a header of a packet matches both the first micro SID and the second micro SID through a single lookup in the destination lookup table.

2. The method of claim 1, wherein the route entry further comprises one or more actions to be performed on the packet.

3. The method of claim 2, wherein the one or more actions comprise a shift of a position of the second micro SID in the header and a forward of the packet along a shortest path to the second network device.

4. The method of claim 1, further comprising:
    receiving, by the first network device, the packet comprising the header;
    determining, by the first network device and based on the route entry in the destination lookup table, that the at least a portion of the header matches the first micro SID and the second micro SID in the route entry through the single lookup in the destination lookup table;
    based on the at least a portion of the header matching the first micro SID and the second micro SID in the route entry, removing, by the first network device, the first micro SID from the header and shifting a position of the second micro SID in the header to obtain an updated header that includes a shifted second micro SID; and based on the second micro SID in the header, forwarding, by the first network device and into the network towards the second network device, the packet comprising the updated header.

5. The method of claim 4, wherein the forwarding the packet comprising the updated header comprises forwarding the packet comprising the updated header without performing a lookup in the destination lookup table of the updated header.

6. The method of claim 4, wherein the shifting moves the second micro SID to a previous location of the first micro SID in the header.

7. The method of claim 4, wherein the forwarding the packet comprising the updated header into the network comprises forwarding the packet comprising the updated header to an egress forwarding unit for the egress forwarding unit to forward into the network.

8. The method of claim 1, wherein a forwarding path of a forwarding unit comprises at least one of an Interior Gateway Protocol (IGP) flex parser, a destination lookup unit, and an ingress results parser, wherein the forwarding unit comprises the destination lookup table.

9. The method of claim 1, wherein the first micro SID and the second micro SID each has a length of 16 bits.

10. A first network device comprising:
processing circuitry coupled to a memory; and
a forwarding path, wherein at least a portion of the forwarding path is stored in the memory and is executable by the processing circuitry;
wherein the processing circuitry is configured to:
receive an advertisement originated by a second network device in a network, wherein the advertisement specifies a second micro segment identifier (SID) associated with the second network device; and
store, in a destination lookup table, a route entry comprising both a first micro SID associated with the first network device and the second micro SID to enable a determination of whether at least a portion of a header of a packet matches both the first micro SID and the second micro SID through a single lookup in the destination lookup table.

11. The first network device of claim 10, wherein the route entry comprises one or more actions to be performed on the packet.

12. The first network device of claim 11, wherein the one or more actions comprise a shift of a position of the second micro SID in the header and a forward of the packet along a shortest path to the second network device.

13. The first network device of claim 10, wherein the processing circuitry is further configured to:

receive the packet comprising the header;
determine, based on the route entry in the destination lookup table, whether the at least a portion of the header matches the first micro SID and the second micro SID in the route entry through the single lookup in the destination lookup table;
based on the at least a portion of the header matching the first micro SID and the second micro SID in the route entry, remove the first micro SID from the header and shift a position of the second micro SID in the header to obtain an updated header that includes a shifted second micro SID; and
based on the second micro SID in the header, forward into the network towards the second network device, the packet comprising the updated header.

14. The first network device of claim 13, wherein as part of forwarding the packet comprising the updated header, the processing circuitry is configured to forward the packet comprising the updated header without performing a lookup in the destination lookup table of the updated header.

15. The first network device of claim 13, wherein the shift moves the second micro SID to a previous location of the first micro SID in the header.

16. The first network device of claim 13, wherein as part of forwarding the packet comprising the updated header, the processing circuitry is configured to forward the packet comprising the updated header to an egress forwarding unit for the egress forwarding unit to forward into the network.

17. The first network device of claim 10, wherein the forwarding path of a forwarding unit comprises at least one of an Interior Gateway Protocol (IGP) flex parser, a destination lookup unit, and an ingress results parser, wherein the forwarding unit comprises the destination lookup table.

18. The first network device of claim 10, wherein the first micro SID and the second micro SID each has a length of 16 bits.

19. The first network device of claim 10, wherein the destination lookup table supports internet protocol version 6.

20. Non-transitory computer-readable media storing instructions, which when executed, cause processing circuitry of a first network device to perform steps comprising:
receive an advertisement originated by a second network device in a network, wherein the advertisement specifies a second micro segment identifier (SID) associated with the second network device; and
store, in a destination lookup table of the first network device, a route entry comprising both a first micro SID associated with the first network device and the second micro SID to enable a determination of whether at least a portion of a header of a packet matches both the first micro SID and the second micro SID through a single lookup in the destination lookup table.

* * * * *